May 28, 1968  J. T. BASNETT  3,385,540
PARACHUTES

Filed Jan. 26, 1967  2 Sheets-Sheet 1

INVENTOR
JAMES THOMAS BASNETT
BY
Shoemaker and Mattare
ATTORNEYS

May 28, 1968   J. T. BASNETT   3,385,540
PARACHUTES

Filed Jan. 26, 1967   2 Sheets-Sheet 2

INVENTOR
James Thomas Basnett
BY
Shoemaker and Mattare
ATTORNEYS

United States Patent Office 3,385,540
Patented May 28, 1968

3,385,540
PARACHUTES
James Thomas Basnett, Woking, England, assignor to G.Q. Parachute Company Limited, Surrey, England, a British company
Filed Jan. 26, 1967, Ser. No. 611,932
Claims priority, application Great Britain, Mar. 25, 1966, 13,227/66
5 Claims. (Cl. 244—152)

ABSTRACT OF THE DISCLOSURE

A parachute has a canopy with controlled openings, vanes attached to the canopy adjacent the openings and control lines attached to the vanes so that operation of the control lines moves the surface of the canopy adjacent the openings rather than the edge only of the opening, and creates a controlled surface, over which the escaping air passes, reducing eddy currents and increasing the lift.

---

This invention relates to parachutes of the type having a canopy and rigging lines for connecting the canopy to a parachutist in which the canopy is provided with a plurality of openings the size or shape of which can be altered by the parachutist whilst the parachute is in flight.

Canopies are known in which these openings are arranged along or parallel to the seams connecting the gores of which the canopy is made, the seams running from the apex to the peripheral hem of the canopy and the openings running for part of this length. The sizes of the openings are controlled by control lines connected to the edges of the openings so that the sizes of the openings can be altered by the parachutist whilst the parachute is in flight.

The object of this invention is to provide means whereby the material adjacent the opening, rather than the edge only of the opening, is moved when the control line is operated.

Another object of the invention is to provide the openings in such positions that the air flow from one controlled opening flows over the top of the next controlled surface to enhance the flow from the next opening to increase the lift.

According to this invention a parachute comprises a canopy having rigging lines for connecting the canopy to a parachutist, controlled openings in the canopy, and control lines by means of which the sizes and/or shapes of the said openings can be altered by the parachutist whilst the parachute is in flight, in which means are provided on the canopy to ensure that the material adjacent each opening, rather than the edge only of the opening, is moved when the associated control line is operated.

The invention also includes a parachute comprising a canopy having rigging lines for connecting the canopy to a parachutist, controlled openings in the canopy, and control lines by means of which the sizes and/or shapes of the said openings can be altered by the parachutist whilst the parachute is in flight, in which one or more vanes are provided on the canopy adjacent each of the said controlled openings and the control lines are connected to these vanes so that the material adjacent each opening is moved when the associated control line is operated.

Further the invention includes a parachute comprising a canopy having rigging lines for connecting the canopy to a parachutist, a plurality of controlled openings in the canopy, vanes attached to the material adjacent said controlled openings, control lines attached to the vanes by means of which the parachutist can alter the sizes and/or shapes of the said controlled openings whilst the parachute is in flight, and one or more openings in the said canopy to give the canopy a predetermined direction of flight, in which the said vanes also control the surfaces of the canopy over which passes the air escaping from the controlled openings.

Figure 1:
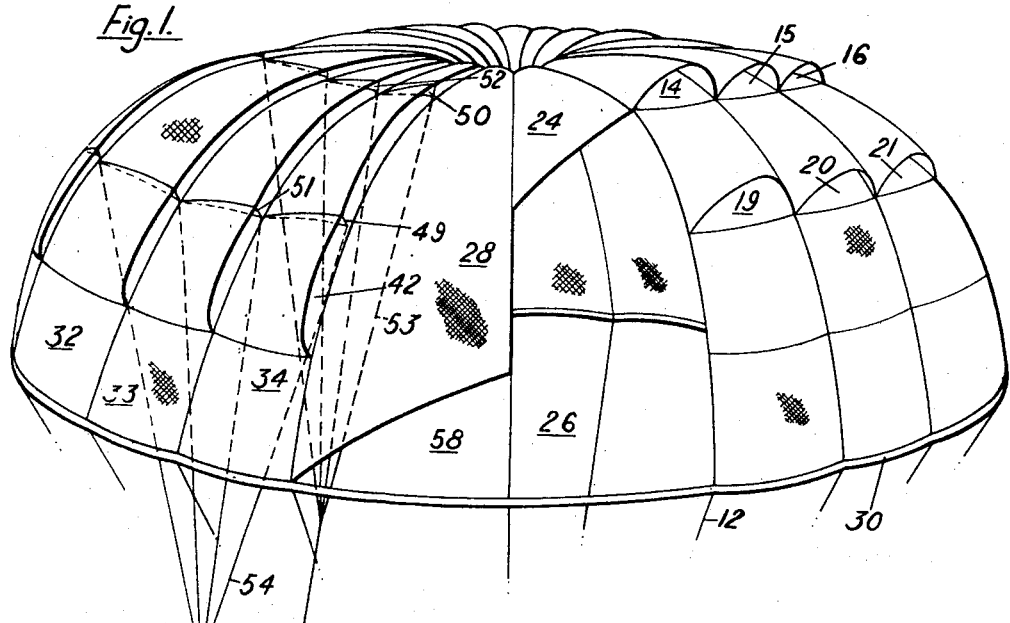
Figure 2:
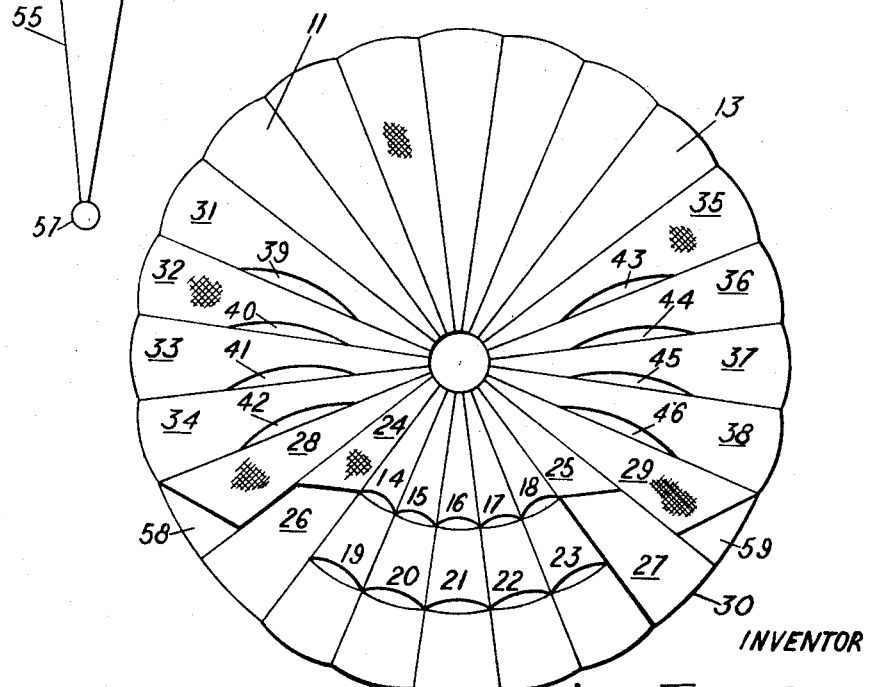
Figure 3:
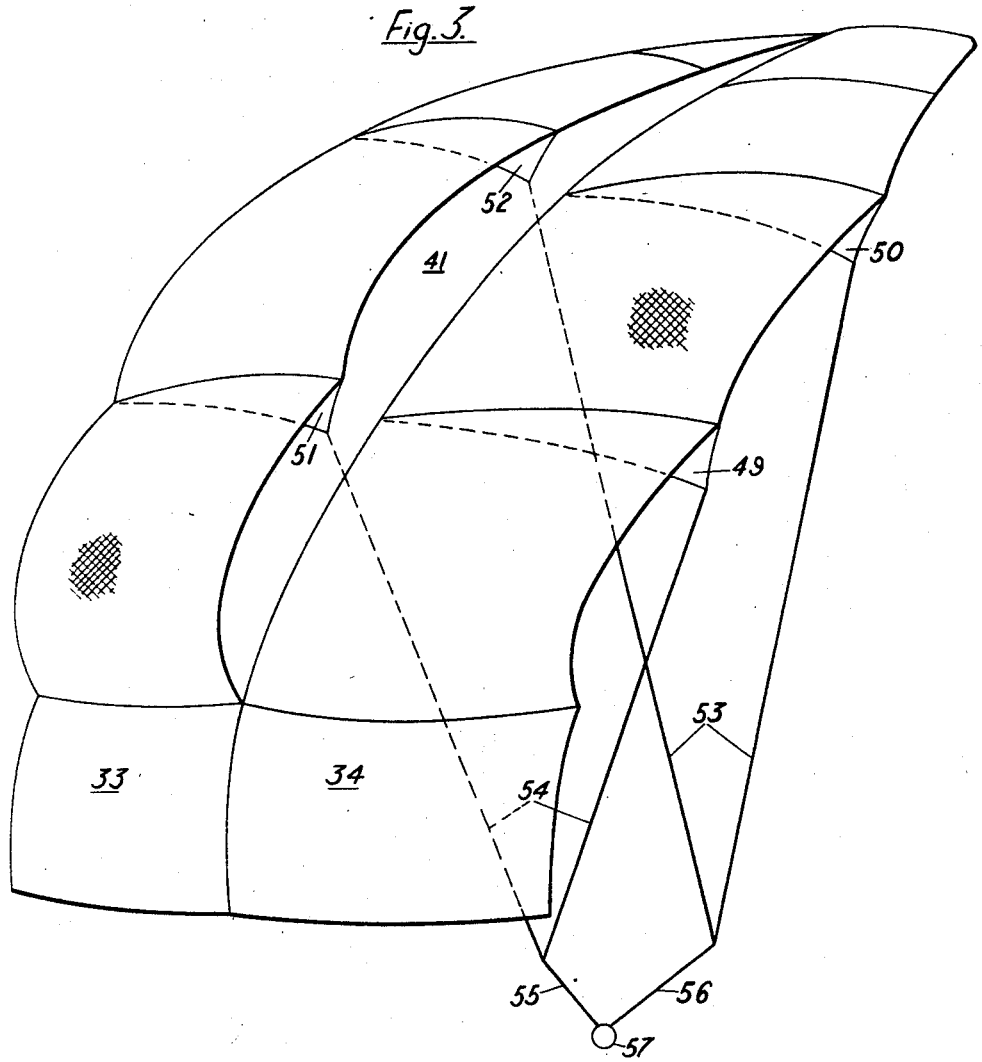

The invention is described hereinafter with reference to the accompanying drawings of which FIGURE 1 illustrates a parachute according to the invention in flight, FIGURE 2 is a plan view of the canopy illustrated in FIGURE 1 and FIGURE 3 is a detail of the canopy.

As shown in the drawings the parachute comprises a canopy 11 which is connected to a parachutist, not shown, by rigging lines 12.

The canopy comprises 24 gores of approximately triangular shape which are connected together to form a canopy of conventional semi-spherical shape when inflated. Five adjacent gores are provided with openings 14 to 23 which give ten openings in two rows covering the width of the five gores. The distance between the openings 19 to 23 and the peripheral hem of the canopy is about one quarter of the distance from the peripheral hem to the apex of the canopy. The openings 14 to 18 are at about the middle of the gores. Gores 24 and 25, which are the gores next those with the openings, are short gores which terminate on the sides adjacent the openings at about the positions of openings 14 and 18. They terminate slightly nearer the peripheral hem on the other sides giving openings 26 and 27 between the ends of the gores and the hem tape 30. The next gores 28 and 29 extend to the peripheral hem on the sides away from gores 24 and 25 respectively but are slightly shorter on the sides joining the gores 24 and 25 to give triangular openings 58 and 59 between the ends of the gores 28 and 29 and the peripheral hem tape 30. These nine gores provide a vented part to the canopy which ensures that the canopy will normally fly with these nine gores at the rear.

Openings 39, 40, 41 and 42 are provided along the seams between gores 31 32, 32 33, 33 34, and 34 28 respectively, that is, along the seams of the next four gores adjacent gore 28. Openings 43, 44, 45 and 46 are provided along the seams between gores 35 36, 36 37, 37 38, and 38 29 respectively, that is between the four gores next adjacent gore 29. All these openings extend over about the central half of the gore seams. Two triangularly shaped vanes 49 and 50 are provided across gore 34, the vanes being positioned on the gore to divide the opening 42 into three equal parts. The vanes are approximately isosceles in shape, the two equal sides being equal to the width of the gore at the point of attachment and the base about one quarter of that length. Control lines 53 and 54 are connected to the free corners of vanes 50, 49 respectively. The vanes are below the canopy gores when the canopy is in flight. Similar vanes are connected to gores 31, 32, 33, 35, 36, 37 and 38, those connected to gore 33, namely vanes 51 and 52 being shown more clearly in FIGURE 3. Control lines 53 and 54 are also connected to the vanes of all the gores 31 to 33 and all the control lines 53 are connected together and to the ring 57 by line 56. Control lines 54 are also connected together and to ring 57 by line 55. The control ring 57 is within reach of the parachutist whilst the parachute is in flight. Similar control lines are connected to the vanes on gores 35 to 38 and these control lines are connected to another control ring (not shown).

The openings convert the central portions of the gores into louvres and the control lines connected to the vanes control not only the extent to which the louvres are open, but also the surface of the canopy above the louvres over which the air from the adjacent forward louvre passes. By adjusting the openings in the canopy and the surface of the louvres, the parachutist can control his rate and direction of glide and his rate of descent. With four openings provided on each side of the canopy the air flow from three of the openings on each side passes over a controlled surface, and the air from the rearmost opening is also subjected to a boosted air flow so that the flow generates considerable lift.

It is preferable for the trailing edges of the louvres to just brush the leading edges of the next adjacent louvres.

The louvres can be pulled into the canopy so that the direction of airflow through them is reversed. This gives a braking effect on the canopy. This effect may stop the forward motion of the canopy but as air continues to flow through the openings over the surface of the canopy lift is still generated and the canopy does not sink rapidly. The air passing through the openings follows the curvature of the louvres and does not turbulate or change direction rapidly.

The invention is not restricted to the use of four openings on each side of the canopy. Five or more openings, or three or fewer openings could be provided on either side of the canopy. Also only one vane or more than two vanes could be provided on each louvre. Although it is preferable that the canopy should have a predetermined direction of flight the invention is not restricted to the particular form of openings described above to attain this objective.

I claim:

1. A parachute comprising a canopy having a plurality of gores and rigging lines for connecting the canopy to a parachutist, a plurality of radially extending controlled openings in the canopy, separate vanes attached to the material adjacent said controlled openings, and extending transversely of said gores and on the inner side thereof, control lines attached to one corner of said vanes by means of which the parachutist can alter the sizes and shapes of the said controlled openings whilst the parachute is in flight, and in which the said vanes also control the surface of the canopy over which passes the air escaping from the controlled openings.

2. A parachute as claimed in claim 1 in which more than one controlled opening is provided on each side of the canopy, the openings on each side being so positioned that the air flow from one controlled opening flows over the adjacent controlled surface to enhance the flow from the adjacent controlled opening.

3. A parachute as claimed in claim 1 in which the said openings are of such sizes that the control lines can move the controlled surfaces from positions outside the said canopy to positions inside the said canopy, and vice versa.

4. A parachute as claimed in claim 1 in which one or more openings are provided in the said canopy to give the canopy a predetermined direction of flight.

5. A parachute as claimed in claim 1 in which said controlled openings are along or parallel to the gores of the canopy, and extend over part only of the distance from the peripheral hem to the apex of the canopy.

References Cited

UNITED STATES PATENTS

| | | | |
|---|---|---|---|
| 2,384,416 | 9/1945 | Derry | 244—152 |
| 2,392,946 | 1/1946 | Quilter | 244—152 |
| 3,013,753 | 12/1961 | Hughes et al. | 244—145 |
| 3,228,637 | 1/1966 | Gross | 244—152 |
| 3,285,546 | 11/1966 | Jalbert | 244—145 |

MILTON BUCHLER, *Primary Examiner.*

R. DORNON, *Assistant Examiner.*